United States Patent [19]
Okuniewski et al.

[11] 3,762,562
[45] Oct. 2, 1973

[54] DIAMOND BEAD COUPLING DEVICE

[76] Inventors: Vincent F. Okuniewski, 5136 Gerald St., Warren, Mich. 48092; Leonard B. Flowers, 753 E. Valley Chase, Bloomfield Hills, Mich. 48013

[22] Filed: Aug. 8, 1972

[21] Appl. No.: 278,782

[52] U.S. Cl. .............................. 210/460, 285/238
[51] Int. Cl. ............................................ B01d 29/10
[58] Field of Search ........................... 210/449, 460; 285/238, 259

[56] References Cited
UNITED STATES PATENTS

| | | | |
|---|---|---|---|
| 1,199,628 | 9/1916 | Stauffer | 210/460 |
| 150,525 | 5/1874 | Carpenter | 210/460 |
| 621,937 | 3/1899 | Niemann | 210/460 |
| 3,472,457 | 10/1969 | McAvoy | 285/238 X |

*Primary Examiner*—Samih N. Zaharna
*Assistant Examiner*—Richard W. Burks
*Attorney*—Benjamin W. Colman

[57] ABSTRACT

A coupling for removable attachment to the end of a resilient flexible washing machine liquid discharge hose, having diamond-shaped hose engaging beads or lugs on the interior surface of the coupling, is provided. The coupling is further provided with an outwardly directed annular flange and internally with at least two opposed radially inwardly directed stop lugs to limit telescoping insertion of the flexible rubber hose. A modified form of the diamond beads or lugs is also disclosed. The coupling is particularly adapted to support filter means for the liquid discharged from the washing machine hose.

24 Claims, 13 Drawing Figures

PATENTED OCT 2 1973 3,762,562

DIAMOND BEAD COUPLING DEVICE

For some time, particularly since domestic automatic washing machines have been manufactured and in use, a problem has arisen in trapping the lint and relatively solid particles discharged by the washing machine through a hose to prevent clogging drain outlets or laundry tubs normally used to receive such discharged liquid. Although efforts have been made to prevent the discharge of such lint and relatively solid particles from the washing machine by the application and use of lint collectors in the machine, such devices have not proven entirely satisfactory. Further, many washing machines of the automatic type are not provided with lint collectors, and in either case it has been found that the drains tend to clog and fill with lint and other deleterious matter discharged from the washing machine so that drainage of the discharged liquid is severely impaired or cannot be effected. The coupling device of this invention embodies features permitting the housewife, the usual washing machine operator, to removably attach the coupling with ease and to apply and support a filter medium upon the coupling, whereby lint and drain-clogging matter are trapped and collected before the liquid flows into the drain.

The invention involves, in a preferred embodiment, the provision of a coupling member for the discharge hose of a washing machine having a hub section and an annular flange extending outwardly from the hub, upon which a suitable filter for the liquid discharged from the washing machine can be affixed, to trap and contain lint and other deleterious drain-clogging matter normally discharged by washing machines. The coupling member on its interior bore surface is provided with spaced apart radially inwardly directed diamond shaped beads or lugs which removably engage and partially penetrate the exterior of the resilient flexible rubber hose end manually inserted into the coupling bore. The coupling is further provided with at least a pair of spaced apart opposed inwardly directed stop lugs adjacent the distal end of the coupling to abut the distal end of the flexible rubber hose inserted within the coupling bore.

By virtue of the diamond beads on the interior bore surface of the coupling, an annular space is provided between the outer surface of the resilient rubber hose and the interior bore surface of the coupling intermediate the engaging diamond beads or lugs. Such annular space allows for relief discharge of washing machine liquid from a filter which may have become substantially fully clogged and through which little if any of the liquid can be discharged. The annular space constitutes a safety feature in the functional efficiency and operation of the washing machine for its discharge of washing or rinsing liquids.

It is an object of the invention to provide a coupling for the support of filter means which is adapted to be manually removably attachable easily and readily by the average automatic washing machine operator to the distal end of a washing machine liquid discharge hose. A further object is to provide a coupling member having diamond shaped beads or lugs on the interior surface of the bore of the coupling which project radially inwardly from such surface. Still another object is to provide hose end stop means adjacent the distal end of the coupling whereby the hose end can be inserted into the coupling bore up to and abut these stop lugs. Yet a further object is the provision of diamond shaped beads on the interior surface of the coupling member, in normal or modified form, for partial penetration into and engagement with the resilient flexible body of the washing machine discharge hose. Still a further object is to provide a coupling for the discharge hose of a washing machine upon which filter means of any suitable type can be manually secured and removably retained for the filtering of washing machine discharge liquid and the collection of lint and other deleterious matter therefrom, to prevent the clogging of drains into which such liquid is discharged.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a perspective view of a coupling and attached filter means embodying a preferred form of the invention.

Figure 8:
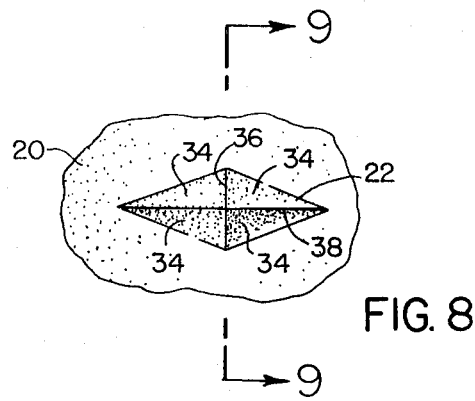
FIG. 8 is an enlarged elevational view of a diamond-shaped bead or lug on the interior bore surface of the coupling illustrated in FIG. 2.
Figure 9:
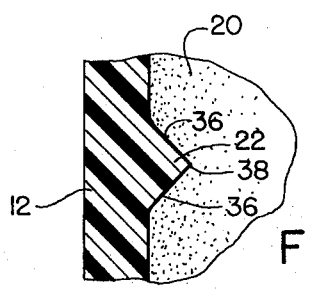
Figure 10:
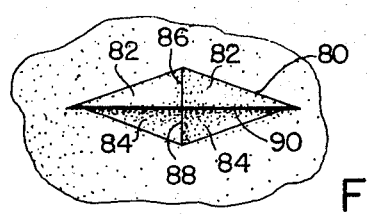
FIGS. 10 and 12 are elevational views similar to FIG. 8 showing modified forms of the diamond-shaped beads or lugs that may be utilized in the coupling of this invention.
Figure 11:
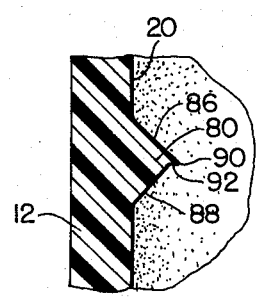
Figure 12:
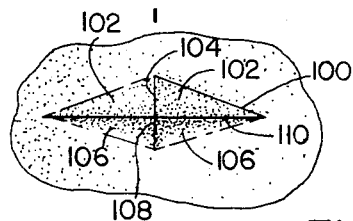
Figure 13:
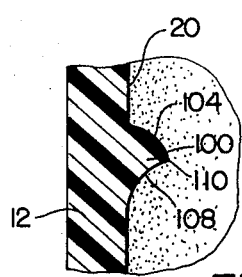

FIGS. 9, 11 and 13 are vertical sectional views taken substantially on the lines 9—9, 11—11 and 13—13 of FIGS. 8, 10 and 12 respectively.

As illustrated in the several views of the drawings, and particularly in FIGS. 1, 2, 5, 6, 8 and 9, the coupling 10 is provided with a body 12 having a hub section 14, an outer annular flange 16, an internal flange 18, a bore 20, and radially inwardly projecting diamond-shaped beads or lugs 22 on the surface of the bore.

Figure 6:
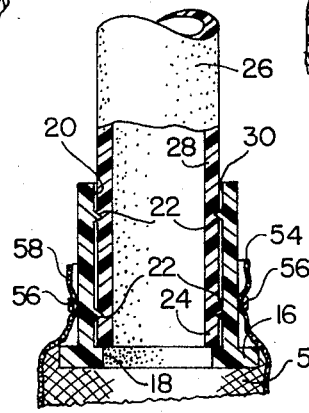
FIG. 6 is a vertical sectional view of the filter, coupling and hose section taken substantially on the line 6—6 of FIG. 5.

As particularly shown in FIG. 6, the distal end portion 24 of the washing machine liquid discharge hose 26 is inserted into the hub 14 until it abuts the interior flange stop 18. The body 28 of the hose is partially penetrated by the diamond-shaped beads 22 to frictionally retain the distal hose portion 24 within the coupling. The beads 22 also tend to hold at least portions of the hose body 28 from the surface of the bore 20 so as to provide a spacing 30 therebetween.

The diamond-shaped beads 22 are more clearly illustrated in FIGS. 8 and 9, wherein the quadrants 34 are defined by the vertical and horizontal lines 36 and 38 respectively. Preferably, the quadrants 34 blend at their outer edges into the body 12 of the bore surface 20, although a sharp line of demarcation may alternatively be provided.

A filter bag 50 made of woven plastic screening, or relatively porous non-woven material, or any other suitable material adapted to rap and retain lint and particulate solid matter that may be discharged from the washing machine hose 26 can be utilized with the coupling 10. The porosity or screen size of the filter bag 50 is of course optionally selectively determined by the user or the manufacturer. Presently available conventional fly and insect screening of a vinyl screen cloth has been found quite satisfactory for trapping and retaining lint material discharged through the hose 26, but of course other equivalent or even superior materials can be utilized for filtering purposes.

The filter bag 50 is preferably though not exclusively fabricated by closing off its cylindrical body 51 at its bottom end 52 in any suitable manner and provided with an open top end 54 which will slip over the outer annular flange 16 of the coupling 10 so that a suitable fastener or tie member such as the string or ribbon 56 can be drawn through openings in the distal end portion 58 of the filter bag adjacent its open end 54 to closely secure the portion 58 upon the hub 14 and above the annular flange 16 whereby the filter bag 50 is retained upon the coupling 10.

Figure 1:
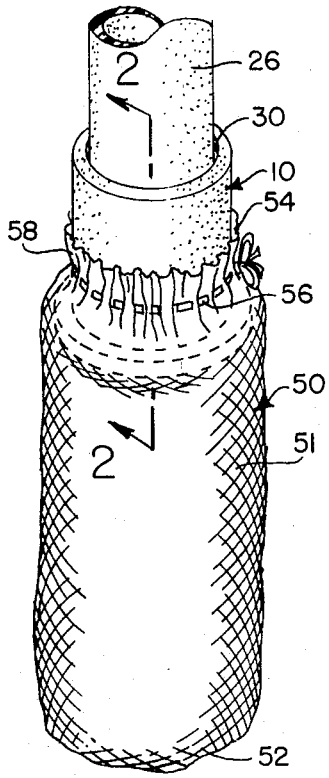
Figure 2:
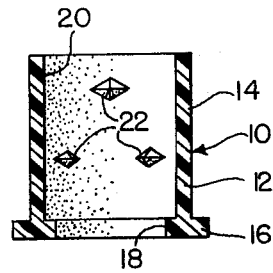
FIG. 2 is a vertical sectional view of the coupling taken substantially on the line 2—2 of FIG. 1.
Figure 3:
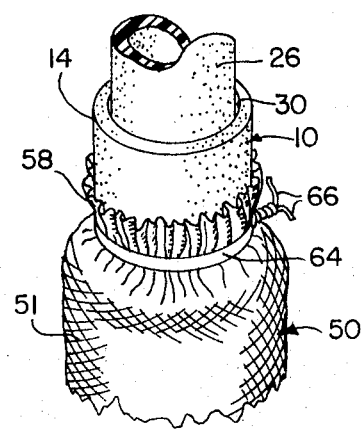
FIGS. 3 and 4 are fragmentary perspective views showing different equivalent fastening means for securing filter means to the coupling.
Figure 4:
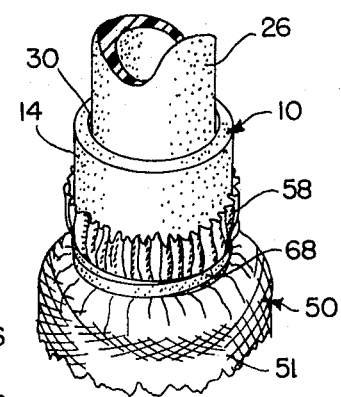
Figure 5:
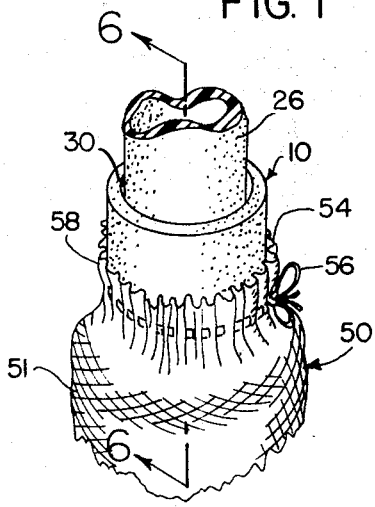
FIG. 5 is a fragmentary perspective view, similar to FIG. 1, for a second preferred form of the invention.

Alternate equivalent means for securing the filter bag 50 to the coupling 10 are illustrated in FIGS. 3 and 4. In the FIG. 3 showing, the distal portion 58 of the filter bag is secured by an externally applied wire or plastic tie 64, the ends 66,66 of which are twisted tightly together upon the filter bag until the portion 58 is closely secured about the hub portion 14. And in the FIG. 4 showing, the filter bag portion 58 is closely secured on the coupling 10 by an elastic band 68 looped about the portion 58 to compress it upon the coupling hub section 4.

Figure 7:
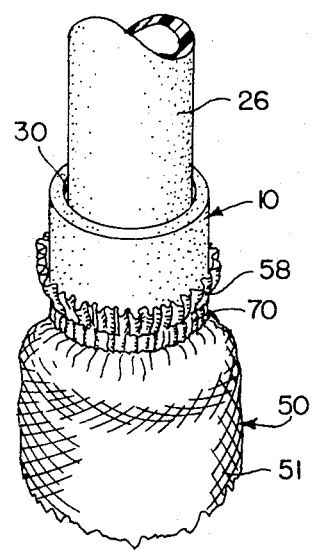
FIG. 7 is a fragmentary perspective view similar to those illustrated in FIGS. 3 and 4 showing another equivalent fastening means for a filter medium.

Another alternate equivalent form for removably securing the filter bag 50 to the coupling 10 is illustrated in FIG. 7, wherein the distal end portion 58 of the filter bag is provided with an elastic gand 70 which is secured either externally or internally to the body 51 of the filter bag by any conventional or suitable means.

Alternate and substantially equivalent forms of the diamond-shaped beads or lugs 22 are illustrated in FIGS. 10-13 inclusive. The diamond-shaped bead 80 (FIGS. 10-11) comprises the upper quadrants 82,82 of slightly larger dimensions than the lower quadrants 84,84 defined by the upper vertical line 86 and the lower vertical line 88 respectively, and by the horizontal line 90 in the plane of the undercut ledge 92 which projects forwardly of the lower quadrants 84,84. The projection defined by the ledge 92 and the edge 90 of the upper quadrants 82,82 provides improved penetration of the bead 80 into the outer surface of the hose body 28 for somewhat improved retention of the hose 26 upon the coupling 10 in the event that additional securement is required under conditions where substantial pressure of the liquid discharged by the hose 26 develops within the filter bag 50 when the screening portion of the bag becomes substantially covered with lint.

Still another form of the diamond-shaped bead (FIGS. 12-13) embodies curved surfaces. The bead 100 is provided with upper convexly curved quadrants 102,102 defined by a vertical medial line 104 and lower concavely curved quadrants 106,106 defined by the vertical medial line 108, the outer edges of the quadrants preferably but not necessarily blending smoothly into the bore surface 20 of the coupling body 12. The horizontal line 110 defines the horizontal edge between the upper and lower convexly and concavely curved quadrants 102 and 106 respectively. The functional operation of penetration into the hose body 28 is believed to be substantially the equivalent of that illustrated in FIGS. 10 and 11 for the diamond-shaped bead 80, but the convexly curved upper quadrants 102,102 should permit facile insertion of the hose end 24 into the coupling bore 20.

The spacing 30 effected by the diamond-shaped beads or lugs when engaged upon the outer wall surface of the hose body 28 permits a relief passageway for liquid that cannot escape through the filter bag 50 should the latter become excessively clogged with lint that requires removal. Such relief passage for the liquid discharged forcefully from the washing machine, once the filter bag is excessively clogged, is a natural result of the design and function of the diamond-shaped beads embodied in the coupling of this invention. The tips of the beads 22, 80 or 100 partially penetrate into the hose body 28 and thus space the outer surface of the hose from the bore surface 20.

Although the diamond-shaped beads are described and illustrated as having quadrants sharply defined by medial vertical and horizontal lines or edges, such lines and edges may be slightly or somewhat blended into the quadrants, since the coupling is preferably formed as a molded plastic part, or in sections secured together by heat and fusion or by a suitable adhesive.

The hose 26 normally used as a discharge conduit connected to the liquid outlet of a conventional powered automatic washing machine is made of a resilient flexible rubber or equivalent material. The distal end portion 24 of the hose 26 is inserted into the hub section 14 of the coupling 10 and passed over the diamond-shaped beads 22, 80 or 100 as the case may be, until the distal end portion 24 of the hose abuts the interior flange 18 of the coupling. The flange 18 may optionally be made in segments or sections generally opposing each other, instead of being a full annular interior flange. Further, the inner stop flange 18 or portions thereof may lie in a plane at or above the distal end of the coupling bore 20, the diamond-shaped beads or lugs being disposed axially above the inner flange 18. The outer annular flange 16 may be positioned intermediate the ends of the coupling 10, but preferably near or adjacent the distal end of the coupling so that a substantial portion of the hub section 14 is available for securement of the filter bag 50 which depends from the outer flange 16. The removably engageable distal end portion 58 of the filter bag 50 is slipped over the flange 16 of the coupling and is secured upon the hub section 14 above the flange 16 of the coupling 10 by any of the means disclosed herein, or by any other suitable means as may be preferred by the user or the manufacturer of the filter bag 50.

The coupling 10 is preferably molded of substantially rigid plastic materials having good memory characteristics including but not limited to high density polyethylene, high density polypropylene, ABS (acrylonitrile-butadiene-styrene), polystyrene, and other similar or equivalent materials, in a single injection operation or in complementary half-sections that are secured together by heat and fusion or by suitable adhesives. The degree of rigidity required is such that the diamond-shaped beads impress themselves in said hose section to ffect engagement therewith, while permitting manual removal of the coupling 10 from the hose distal end portion 24 with relative ease.

Note should be taken that the diamond-shaped beads or lugs disclosed herein have configurations in which the medial horizontal width is greater in dimension than the medial vertical height. It is believed that such configuration offers less resistance to insertion of the hose distal end into the coupling when the coupling is in effect "screwed" onto or from the hose end, i.e., with a twisting motion, and that such form offers greater resistance to insertion and separation upon axial movement of the coupling relative to the hose end, particularly in separation of the hose from the beads 60 and 80 because of their undercut pointed ledges. The diamond-shaped beads or lugs can of course be made with substantially equal vertical and horizontal medial dimensions, i.e., the beads are "regular" in shape, in which case the relative forces of insertion and separation are believed to be substantially the same.

Once the filter bag 50 becomes substantially coated on its inner surface with lint and particulate matter, it should be removed from the coupling 10 and replaced with a clean filter bag or one which has been cleaned of lint.

Although particular embodiments of the invention have been disclosed herein or purposes of explanation, further modifications or variations thereof, after study of this specification, will or may become apparent to those skilled in the art to which the invention pertains. Reference should be had to the appended claims in determining the scope of the invention.

We claim:

1. In an improved unitary coupling device adapted to be removably secured to the distal end of a relatively resilient flexible liquid discharge hose and to which means for filtering the liquid discharged from said hose can be removably attached, the improved device comprising
    a hub section having an axial bore therethrough adapted to receive and removably engage said hose distal end, an outer flange extending radially outwardly from said hub section,
    said hub section having a body portion above said outer flange adapted to support said filtering means,
    an inner flange extending radially inwardly of said bore adjacent the distal end thereof,
    and a plurality of spaced apart substantially diamond-shaped beads or lugs extending radially inwardly from the surface of said bore and disposed axially of said inner flange to engage and impress said hose distal end inserted within said bore and forced thereover.

2. The improved coupling device defined in claim 1, wherein
    said device is formed of a molded substantially rigid plastic material having substantially good memory characteristics.

3. The improved coupling device defined in claim 1, wherein
    said device is manually attachable to said hose end.

4. The improved coupling device defined in claim 1, wherein
    said hub section and its axial bore are substantially cylindrical in configuration.

5. The improved coupling device defined in claim 1, wherein
    said outer flange is substantially annular in configuration.

6. The improved coupling device defined in claim 1, wherein
    said inner flange is substantially annular in configuration.

7. The improved coupling device defined in claim 1, wherein
    said inner flange comprises discrete spaced apart segments of an annular flange.

8. The improved coupling device defined in claim 1, wherein
    said inner and outer flanges lie substantially in the same plane.

9. The improved coupling device defined in claim 1, wherein
    said inner and outer flanges lie in different planes.

10. The improved coupling device defined in claim 1, wherein said inner flange functions as a stop for and limits the telescoping insertion of said hose end in said hub section bore.

11. The improved coupling device defined in claim 1, wherein
    each of said diamond-shaped beads or lugs is defined by crossing vertical and horizontal medial lines forming quadrants extending at obtuse angles from the surface of said bore substantially to point,
    all said quadrants meeting substantially at the crosspoint of said vertical and horizontal lines.

12. The improved coupling device defined in claim 11, wherein
    said quadrants are planar and relatively clearly defined by said vertical and horizontal lines.

13. The improved coupling device defined in claim 1, wherein each of said diamond-shaped beads or lugs is defined by vertical and horizontal medial lines forming upper and lower pairs of quadrants extending at obtuse angles from the surface of said bore,
    the upper pair of said quadrants being disposed next adjacent each other about one vertical line, and the lower pair of said quadrants being disposed next adjacent each other about another vertical line, said vertical lines lying substantially in a plane,
    said lower pair of said quadrants being recessed toward said bore surface and inwardly from the horizontal line defining the distal edge of said upper pair of quadrants,
    whereby an undercut ledge is provided under said upper pair of quadrants at said horizontal lines and said ledge forms a three-sided point with said upper pair of quadrants.

14. The improved coupling device defined in claim 1, wherein
    each of said diamond-shaped beads or lugs is defined by crossing vertical and horizontal medial lines forming upper and lower arcuate pairs of quadrants extending from the surface of said bore substantially to a point,
    the upper pair of said quadrants having convexly curved surfaces,
    the lower pair of said quadrants having concavely curved surfaces,
    all said quadrants meeting substantially at the crosspoint of said vertical and horizontal lines.

15. The improved coupling device defined in claim 14, wherein said arcuate quadrants are relatively clearly defined by said vertical and horizontal lines.

16. In an improved filter device adapted to be removably secured to the distal end of a relatively resilient flexible liquid discharge hose for filtering the liquid discharged from said hose, the improved device comprising a coupling member adapted to be removably secured by manual attachment to said hose distal end and having a hub section having an axial bore therethrough adapted to receive and removably engage said hose distal end, an outer flange extending radially outwardly from said hub section, said hub section having a body portion above said outer flange adapted to support means for filtering the liquid discharged from said hose, an inner flange extending radially inwardly of said bore adjacent the distal end thereof, and a plurality of spaced apart substantially diamond-shaped beads or lugs extending radially inwardly from the surface of said bore and disposed axially of said inner flange to engage and impress said hose distal end inserted within said bore and forced thereover, and filter means removably secured upon said hub section above said outer flange.

17. The improved device defined in claim 16, wherein said filter means comprises a relatively porous container-shaped bag closed at one end and open at the other, said open end extending above said coupling outer flange, said bag being secured to and about said hub section by a drawstring passed through the portion of said bag adjacent said open end, whereby said filter bag depends from and over said outer flange.

18. The improved device defined in claim 16, wherein said filter means comprises a relatively porous container-shaped bag closed at one end and open at the other, said open end extending above said coupling outer flange, said bag being secured to and about said hub section by a twist tie wrapped about and over the portion of said bag adjacent said open end, whereby said filter bag depends from and over said outer flange.

19. The improved device defined in claim 16, wherein said filter means comprises a relatively porous container shaped bag closed at one end and open at the other, said open end extending above said coupling outer flange, said bag being secured to and about said hub section by an elastic band removably wrapped about and over the portion of said bag adjacent said open end, whereby said filter bag depends from and over said outer flange.

20. The improved device defined in claim 16, wherein said filter means comprises a relatively porous container-shaped bag closed at one end and open at the other, said open end extending above said coupling outer flange, said bag being secured to and about said hub section by an elastic band affixed to the portion of said bag adjacent said open end, whereby said filter bag depends from and over said outer flange.

21. The improved coupling device defined in claim 11, wherein the lengths of said medial vertical and horizontal lines are substantially the same and the areas of said quadrants substantially the same.

22. The improved coupling device defined in claim 11, wherein the length of said medial vertical line is less than the length of said medial horizontal line and the quadrants are broader than they are high, to provide a broader contact area for said bead against axial retraction of said hose end portion from said hub section bore.

23. The improved coupling device defined in claim 13, wherein the length of said medial vertical line is less than the length of said medial horizontal line and the quadrants are broader than they are high, to provide a broader contact area for said bead against axial retraction of said hose end portion from said hub section bore.

24. The improved coupling device defined in claim 14, wherein the length of said medial vertical line is less than the length of said medial horizontal line and the quadrants are broader than they are high, to provide a broader contact area for said bead against axial retraction of said hose end portion from said hub section bore.

* * * * *